US012807093B2

(12) United States Patent
Jakobs et al.

(10) Patent No.: US 12,807,093 B2
(45) Date of Patent: Nov. 24, 2026

(54) HEEL AIRBAG FOR A MOTOR VEHICLE AND MOTOR VEHICLE HAVING AT LEAST ONE HEEL AIRBAG

(71) Applicants: AUDI AG, Ingolstadt (DE); ZF AUTOMOTIVE GERMANY GMBH, Alfdorf (DE)

(72) Inventors: Bernd Jakobs, Nuremberg (DE); Michael Pichler, Karlskron (DE); Michael Grosshauser, Beilngries (DE); Daniel Elija, Spraitbach (DE); Werner Freisler, Schwäbisch Gmünd (DE)

(73) Assignees: AUDI AG, Ingolstadt (DE); ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 19/127,282

(22) PCT Filed: Nov. 10, 2023

(86) PCT No.: PCT/EP2023/081482
§ 371 (c)(1),
(2) Date: May 5, 2025

(87) PCT Pub. No.: WO2024/104917
PCT Pub. Date: May 23, 2024

(65) Prior Publication Data
US 2026/0184280 A1 Jul. 2, 2026

(30) Foreign Application Priority Data
Nov. 14, 2022 (DE) ..................... 10 2022 130 073.0

(51) Int. Cl.
*B60R 21/231* (2011.01)
*B60R 21/00* (2006.01)
*B60R 21/215* (2011.01)

(52) U.S. Cl.
CPC .......... *B60R 21/231* (2013.01); *B60R 21/215* (2013.01); *B60R 2021/0046* (2013.01); *B60R 2021/23176* (2013.01)

(58) Field of Classification Search
CPC .............. B60R 2021/0046; B60R 2021/23176
See application file for complete search history.

(56) References Cited

U.S. PATENT DOCUMENTS 6,158,766 A * 12/2000 Kowalski ................. B60N 3/04 280/751
6,352,281 B1 * 3/2002 Buss ....................... B60R 21/16 280/748
(Continued)

FOREIGN PATENT DOCUMENTS

DE 19933396 A1 1/2000
DE 10032046 A1 * 2/2001 ............. B60R 13/02
(Continued)

OTHER PUBLICATIONS

Computer generated English translation of DE 10032046 (Year: 2001).*
(Continued)

*Primary Examiner* — Jason D Shanske
*Assistant Examiner* — Tiffany L Webb
(74) *Attorney, Agent, or Firm* — Seed Intellectual Property Law Group LLP

(57) ABSTRACT

A heel airbag for a motor vehicle is provided and may include a carrier element, an airbag module arranged on a front side of the carrier element, and a cover fastened to the carrier element and covering the airbag module. A rear side of the carrier element may have a three-dimensional form-fitting structure for connecting to a three-dimensional body structure of the motor vehicle in the mounted position.

17 Claims, 3 Drawing Sheets

(56) References Cited

U.S. PATENT DOCUMENTS

| | | | | | |
|---|---|---|---|---|---|
| 7,246,837 | B2 * | 7/2007 | Dendo | B60N 3/066 | 24/297 |
| 8,459,689 | B2 * | 6/2013 | Roychoudhury | B60R 21/02 | 280/751 |
| 10,889,225 | B2 * | 1/2021 | Jeunehomme | B60N 3/063 | |
| 11,491,939 | B2 * | 11/2022 | Freisler | B60R 21/01512 | |
| 2016/0016527 | A1 * | 1/2016 | Aselage | B60R 21/235 | 29/428 |

FOREIGN PATENT DOCUMENTS

| | | | | |
|---|---|---|---|---|
| DE | 10046886 | A1 * | 6/2001 | B60N 3/044 |
| DE | 102009055837 | A1 | 6/2011 | |
| DE | 102018118903 | A1 | 2/2020 | |
| DE | 102019120627 | A1 | 2/2021 | |
| DE | 102019132986 | A1 | 6/2021 | |
| DE | 102020120476 | A1 | 2/2022 | |

OTHER PUBLICATIONS

Computer generated English translation of DE 10046886 (Year: 2001).*
Computer generated English translation of DE 102019132986 (Year: 2019).*

* cited by examiner

HEEL AIRBAG FOR A MOTOR VEHICLE AND MOTOR VEHICLE HAVING AT LEAST ONE HEEL AIRBAG

BACKGROUND

Technical Field

The disclosure relates to a heel airbag for a motor vehicle.

Description of the Related Art

A plurality of protection devices come into use for the protection of persons in a motor vehicle, for example, in the form of airbags, which are provided in various positions in the vehicle and which comprise an inflatable and deployable airbag, which is associated with a gas generator. In the case of a collision situation, the gas generator is ignited, so that the airbag deploys and expands in the vicinity of the person to be protected The degree of automation of modern motor vehicles that are already partially self-driving and, in the future, will be fully self-driving is increasing. This means that a person in the vehicle is less and less involved in the actual driving operation and can therefore devote themselves to other things. This is also associated with a possibility of adjustment of the seat for the person in a position that is outside the usual range of positions for a vehicle seat in the case of piloted driving. In such a comfort position, the seat is often moved significantly further back than usual, likewise, the backrest can be tilted backwards to a relatively laid-out position so that a laid-out reclining position can be assumed. Even in such a position, the protective systems should of course be effective, which is to say, their protective function must not only be designed with regard to the position range of the person in relation to the piloted driving mode, but also with regard to the position range that can be assumed in extreme seat adjustments. A restraint system comprising a heel airbag is, for example, known from DE 10 2018 118 903 A1. Such a heel airbag is arranged in the footwell of the driver or of front passenger, who can sit on seats that can be accordingly widely adjusted. In the event of a collision, the heel airbag is ignited so that the airbag deploys. This results in a displacement of the heel impact point, which is to say, the position at which the heel and thus the foot, when viewed in the longitudinal direction of the vehicle, is propped up in relation to the body. Without such a displacement of the heel contact point in relation to the longitudinal direction of the vehicle, which is to say, towards the rear of the vehicle, the person would only be propped up in relation to the front of the vehicle at a later point, which is to say, the displacement towards the rear of the vehicle allows an early propping up, which counteracts, for example, a submarining of the quasi-recumbent person through the lap belt.

BRIEF SUMMARY

The present disclosure provides an improved heel airbag that can be easily mounted in the vehicle.

The present disclosure proposes a heel airbag for a motor vehicle comprising a carrier element, an airbag module arranged on a front side of the carrier element, and a cover attached to the carrier element and covering the airbag module, wherein the rear side of the carrier element comprises a three-dimensional form-fitting structure for connecting with a three-dimensional body structure of the motor vehicle in the mounted position.

The heel airbag according to the present disclosure is a multi-part unit consisting or comprising of a carrier element, an airbag module, and a cover attached to the carrier element and protecting the airbag module, so that the airbag module is sandwiched between the carrier element and the cover. The carrier element is provided on its rear side facing away from the airbag module, with a three-dimensional form-fitting structure, which is a negative image of a three-dimensional body structure, which is to say, the body geometry on which the heel airbag is to be positioned and fastened. In this area, the body structure can, for example, have one or more indentations or ribs or similar, which is to say, a structure that deviates geometrically from a flat surface. The form-fitting structure of the carrier element is a negative image of this three-dimensional body structure, which means that the carrier element and thus the heel airbag can be joined to the three-dimensional body structure in a simple form-fitting manner during assembly. As a consequence, the form-fitting structure engages with the body structure in a form-fitting and, if necessary, force-fitting manner, so that the heel airbag is fastened in its position by way of this engagement. As a result, the heel airbag is connected to or respectively positioned on the body in a sufficiently stable manner without additional specific connecting devices. Alternatively or additionally, the carrier element may be clipped to the vehicle structure. A form-fitting structure is then not necessary, but both mounting variants can also be realized together.

As a result, the heel airbag only needs to be inserted in a form-fit at the corresponding body position during assembly. This allows a very quick and simple, but at the same time sufficiently stable arrangement of the heel airbag on the body without the need for various specific connecting or fastening devices such as retaining screws, retaining clips, locking elements or similar devices.

The carrier element itself may be a foam element, such that the carrier element comprises a foamed plastic. The required, potentially complex, three-dimensional form-fitting structure can easily be formed on the rear side of the carrier element by way of a suitable mold. Additionally, a corresponding accommodation geometry for the arrangement of the airbag module to be positioned at the front and, if necessary, the cover may be similarly easily formed by way of a suitable mold. The foam element can also provide a damping function, such that the foam element is a passive padding that is conducive to occupant protection in the normal position.

As described, the airbag module is overlapped by a cover that protects the airbag module. Such a cover may be a plastic film that is appropriately dimensioned so that the airbag module is completely overlapped. In some embodiments, the plastic film may be welded into. Since the airbag module is also a flat assembly after the airbag has been folded up in the basic position, this results in a flat construction comprising: the relatively thin carrier element, which, for example, has a rectangular basic shape; the flat, but nonetheless planar, airbag module; as well as the cover or respectively plastic film, which is also planar. The airbag is consequently a flat overall unit that can easily be integrated into the footwell without reducing the size of the footwell in any disadvantageous way. The airbag module can comprise a housing with the airbag, which is, for example, folded inside, such that the housing is integrated into the carrier element. Instead of a plastic film, a woven fabric, a non-woven fabric or the like may be used. The airbag module can be secured to the carrier element by way of the cover. Alternatively, the airbag module can be attached to the carpet or to the body.

The cover itself, which becomes detached from the carrier element to which it is attached when the airbag is ignited, can be attached to the carrier element or respectively to the foam element in different ways. On top of this, many screw, rivet or snap-in connections, or an adhesive or clamp connection or an overlapping scarf are conceivable. The correspondingly selected type of connection or respectively the number of any eventual local connection positions is chosen so that a sufficiently stable unit encapsulated by the cover is created for "normal operation," but wherein the cover can easily be separated from the carrier element in the event of the ignition of the airbag.

To attach the cover, the cover may be connected to the carrier element along at least two opposite side borders with which the cover laterally overlaps the carrier element. The cover therefore grips the carrier element on two opposite sides, for example, on the left and right. The corresponding connections are positioned in this side area, for example, in the form of simple plastic rivets placed there, which are, for example, plastic-welded to the carrier element in the form of a foam body. Alternatively, a fabric or film can be wrapped therearound or a shrink tube can be shrunk thereon.

In some embodiments, the cover may be provided with a sensor foil for detecting damage to the cover. As described, in the mounted position the heel airbag is located in the footwell, which means that the heel airbag is permanently exposed to a certain load from the person's feet in the footwell. In the mounted position, the heel airbag is overlapped by the carpet lining the body floor or respectively the vehicle floor, on which the feet of the person rest. The movement of the feet or, if necessary, the support, however, exerts a corresponding load on the cover. If the cover is fitted with a sensor film, by way of which the cover being torn or worn through may be detected. This information, which is passed to an associated control device by way of which the heel airbag is controlled, can be processed accordingly and the user can be notified of a necessary replacement or similar.

The airbag module itself comprises a gas generator for its operation, which is designed to be as small as possible or respectively the geometry of which is such that it can be correspondingly easily integrated. Preferably, in relation to the mounted position, the gas generator is positioned in the upper half, in particular in the upper third of the airbag module. This ensures that the gas generator is protected against moisture, as a certain amount of moisture is introduced into the footwell via shoes, for example, in wet conditions or in winter. In this quasi-upper position, the gas generator is also well protected against shocks and vibrations. If required, the gas generator can also be positioned just below the upper half or in the lower half. A filling of the gas generator is possible using a gas lance or an external generator.

In addition to the heel airbag itself, the present disclosure further relates to a motor vehicle comprising a body as well as at least one heel airbag of the type described above, which is form-fittingly connected to a body structure by its form-fitting structure. The motor vehicle according to the present disclosure may comprise such a heel airbag in the footwell of both the driver and passenger or, if the motor vehicle is a correspondingly larger vehicle, in all footwells to which correspondingly adjustable seats are assigned and in which the displacement of the heel impact point which can be achieved with the heel airbag according to the present disclosure is useful for protection purposes.

In some embodiments, the heel airbag may be overlapped by a carpet which is not connected to the heel airbag. Such a carpet lines the interior floor as described. The carpet also overlaps the heel airbag, which is to say that the heel airbag is not visible. The carpet is, however, not connected to the heel airbag, inasmuch as the carpet is also lifted when the airbag is deployed, so that there is ultimately a relative movement of the carpet in relation to the heel airbag due to the extreme increase in volume of the airbag during deployment. Alternatively, the heel airbag can also be connected to the carpet.

As described, having such a heel airbag allows the heel bearing point, which is to say, the heel support point, to be shifted or displaced relative to the body. This heel bearing point is located at the transition from the horizontal floor area of the footwell to the generally diagonally upward angled body area. Through the ignition of the airbag, an inclined bearing surface is formed by way of the airbag, which has a corresponding geometry, which, like the original body wall, extends at an angle to the horizontal floor surface, so that the heel support point, which is more or less displaced towards the rear of the vehicle, is formed in the transition area between the horizontal floor surface and the inclined bearing surface defined by the deployed airbag. In some embodiments, a bearing surface shape can also be created through the airbag, which shape does not correspond to the shape of the body wall, which is to say, the bulkhead, which can be used to vary the heel support point. In order to be able to unequivocally define this heel support point, a hinge-like bend line may be formed on the carpet extending adjacent to a lower end of the heel airbag. This bend line ensures that the carpet, which, as described, is not connected to the heel airbag, is installed in a defined manner about this bend line when the airbag is ignited. There is no uncontrolled movement of the carpet, rather, on the contrary, there is a clear transition from the horizontal carpet area, which is not positioned over the airbag, to the supporting carpet area, which is positioned over the airbag in the style of an abutment. This bending or hinge line therefore clearly forms the transition that defines the heel bearing point. Alternatively, the airbag may only serve as a cushioning element and to fill the footwell, so that, for example, the ankle is prevented from giving way from the footrest or pedal set or alternatively a movement is damped. In this case, the heel support point would remain unchanged.

A hinge-like bend line running adjacent to an upper end of the heel airbag can also be configured on the carpet. This means that the carpet can also be bent about a defined bend line in the area of the upper end of the deploying airbag, so that there is no uncontrolled arching of the carpet in this area and, in particular, the upper carpet end is accordingly secured, which is to say, the carpet cannot be thrust in a whip-like manner into the footwell.

The carpet itself may comprise a carpet layer and a carrier layer applied underneath it, in particular a foam layer, wherein the carrier layer is not provided in the area in which the carpet overlaps the airbag module. The carpet is therefore a multi-layered structure. The carpet comprises the carpet layer, usually a corresponding knitted or woven fabric, and a carrier layer connected to the carpet layer, usually a foam layer. This carrier layer is relatively stable, so that the carpet itself has a predetermined, three-dimensional shape and, in particular, a defined three-dimensional floor shape is defined by way of the carrier layer, so that the carpet can be placed on the body floor as a more stable structure and can already be arranged in a fixed position above the body floor. A separate adhesion or other type of fastening is not usually carried out. This carrier layer is, however, not provided in the area in which the carpet overlaps the heel airbag, which is to say that only the carpet layer exists in this area. As a result, a corresponding edge is formed where the carrier layer is removed and where only the carpet layer exists. This edge area can now serve as a bend line in the sense described above.

Additionally or alternatively, a strip that defines the bend line can also be arranged on the carpet, which strip is connected to a substructure. This strip, which can also be referred to as a rail or straightedge, is placed, for example, on the carpet layer after the carpet has been positioned and is screwed to the substructure, which is to say, the body, using connecting screws. This can also be used to define a corresponding clear, sharp bend line for the loose carpet layer, naturally also in combination with any bending edge defined by way of the carrier layer.

Alternatively, the carpet may be secured to the substructure by way of hook connections. On the underside of the carpet layer or the carrier layer, corresponding latching hooks or similar can be provided, which are latched into corresponding apertures in the substructure, which is to say, the body, so that this once again provides a corresponding securing to the substructure, by way of which the bend line can be defined.

Ultimately, a linear material recess that defines the bend line may be provided on the underside of the carrier layer or of the carpet layer. In this case, for example, a corresponding longitudinal groove is made in the carrier layer, which defines the bend line. In this case, the carpet area, which overlaps the heel airbag, can also comprise the carrier layer, which, however, is correspondingly weakened at the bend line, so that ultimately only the carpet layer is present there, which can then be easily bent about the bend line during airbag ignition.

When the airbag deploys, this results, as described, in a displacement of the carpet, which is arched forward into the footwell. This also results in a movement of the carpet in the right and left side areas. In order to enable this lateral movement to a sufficient extent, the present disclosure, moreover, provides for the carpet to be covered on one or both longitudinal sides, as is regularly the case, with one or two cladding elements, usually an elongated plastic component, which, on the one hand, is arranged in the sill area and, on the other hand, is formed in the area of the center console or by the center console itself. The carpet with a side section extends underneath the cladding element in such a way that upon deployment of the airbag, the carpet can be pulled out with the side section that is underneath the cladding element. If the airbag is ignited, the carpet arches in the footwell. In order to not hinder this arching due to tensioning of the carpet, the configuration of the disclosure allows the side carpet section or sections to be pulled out from under the cladding element or elements, so that the airbag can also be fully deployed in the direction that is transverse in relation to the vehicle. The carpet is therefore neither attached to the sides in any way nor held in any other way, rather the carpet can be pulled out sideways when the appropriate force resulting from the deployment is applied.

As an alternative to such an extraction of the carpet sections below the cladding element, the carpet may be covered on one or both longitudinal sides with a cladding element, wherein the carpet with a side section extends below the cladding element, wherein in this variant the carpet is perforated to form a tear line in the area of the cladding element. Such a perforation, which may be provided in an area below the cladding element and thereby concealed, makes it possible for the carpet to tear open along this perforation and consequently does not prevent further deployment of the airbag, so that, once again, the airbag can also deploy completely in the transverse direction.

In some embodiments, the cladding element itself, which overlaps the carpet in the side area, may have a flexible section in the area of the end adjacent to the carpet or can be bent out using a bend line. In this configuration, a targeted deformation of the cladding element itself occurs as a result of the force acting on the cladding element upon deployment of the airbag. A corresponding section of the cladding element, which is either flexible in terms of material or bendable using a bend line, is deformed, which is to say, lifted, when the airbag is deployed, so that this section does not oppose the tracking of the carpet and thus the airbag deployment in the transverse direction.

Whereas no objects obstruct the deployment of the airbag in the passenger footwell, the pedal set, by way of which piloted driving is possible, is located in the footwell of the driver. In order for this pedal set to not excessively hinder the deployment of the airbag, the present disclosure provides for the airbag to have a shape adapted to an adjacent pedal set in the deployed state. Consequently, the airbag folds in the direction of the pedal set or even against the pedal set, but is shaped in such a way that its final shape takes into account the position or respectively the geometry of the pedal set. At least one indentation can be formed on the carpet, into which at least one pedal is embedded when the airbag is deployed. Of course, a plurality of such indentations can also be provided if a plurality of pedals are provided, which pedals can, however, also be inserted into a common indentation. The purpose of this configuration is that, in the deployed state, the upper side of the pedal or pedals is virtually flush with the upper side of the carpet position in which the indentation is molded. This can be used to create a bearing surface that is as flat as possible, in which bearing surface the pedal or pedals are embedded. The pedal or pedals has/have, in principle, a rear side that is as free of edges and sharp points as possible, so that damage to the airbag by a pedal during deployment is ruled out.

DETAILED DESCRIPTION

Figure 1:
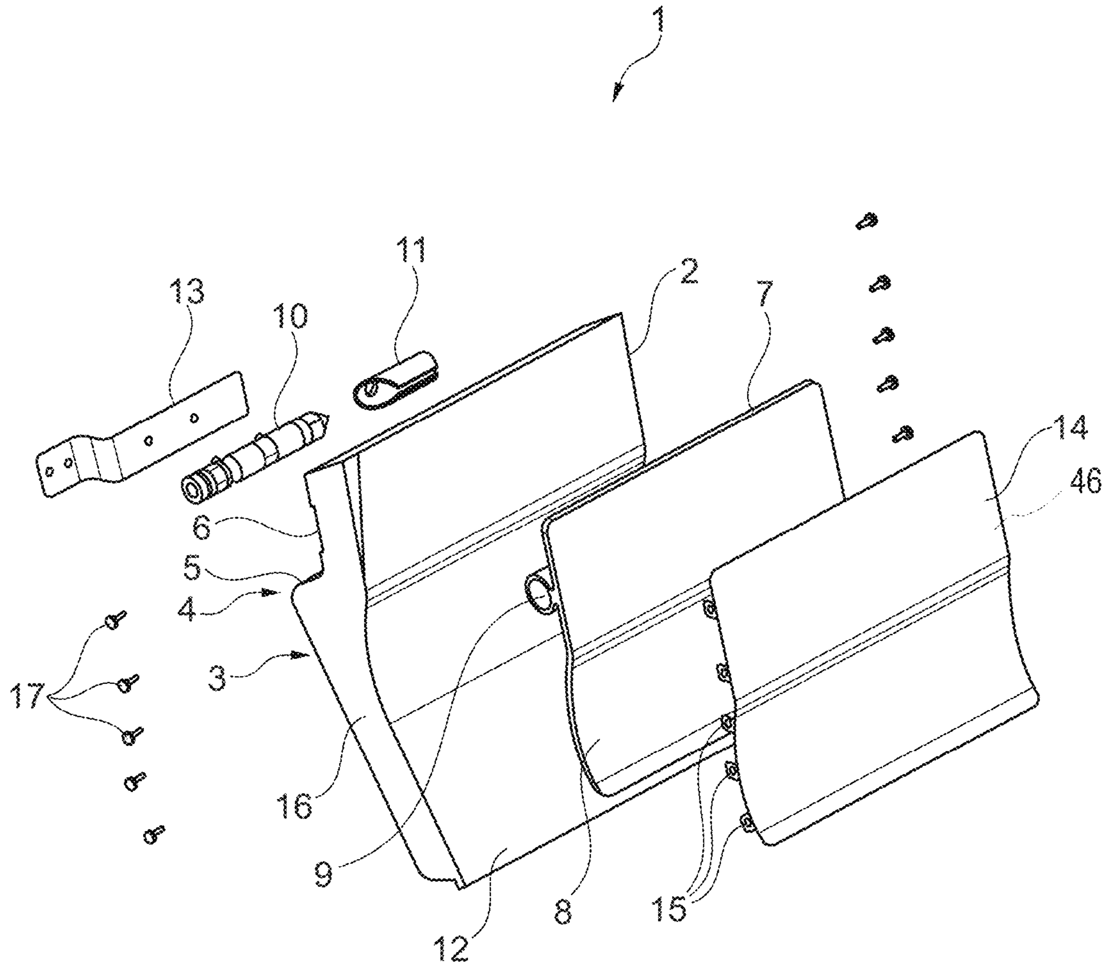
FIG. 1 shows an exploded view of a heel airbag according to the present disclosure.

FIG. 1 shows an exploded view of a heel airbag 1 according to the present disclosure. The heel airbag comprises a carrier element 2, preferably in the form of a foam element, which thus consists of a foamed but sufficiently stable plastic. The carrier element 2 comprises a rear side 3, which is provided with a three-dimensional form-fitting structure 4, which here comprises, for example, a step 5 extending across the width of the carrier element 2, which adjoins the otherwise flat underside, as well as a transverse groove 6. The form-fitting structure 4 shown or respectively its geometry is, however, only given by way of example, the form-fitting structure 4 can also be configured in any other three-dimensional manner. In any case, the form-fitting 4 is a negative image of a three-dimensional body structure of the motor vehicle, which is to say, the vehicle floor panel on which the heel airbag 1 is to be mounted. The form-fitting structure 4 in conjunction with the body structure results in a three-dimensional form-fit, by way of which the heel airbag 1 is precisely positioned and secured without the need for additional fastening elements. The actual final securing then takes place by way of an overlapping carpet, as will be discussed below.

The heel airbag 1, moreover, has an airbag module 7, comprising a folded up airbag 8 and an accommodation 9 for a gas generator 10 together with an associated diffuser tube 11. The airbag module 7 is flat when in a folded state, the airbag module 7 is slightly smaller than the upper side 12 of the carrier element 2, on which the flat airbag module 7 is placed. Also shown is a mounting plate 13, which is connected to the gas generator 10 on the one side, and which is secured to the body on the other side. This mounting plate 13 serves to hold or respectively secure the gas generator 10 so that the gas generator 10 remains in position during the ignition process, during which the gas generator 10 generates a high volume of gas which is used to inflate the airbag 8, and, as the gas generator is only operated in the event of a collision, does not slip, so that complete inflation of the airbag 8 is ensured.

Also shown is a cover 14, preferably a plastic film, which may also be provided with a sensor film 46. The size of the cover 14 is slightly larger than that of the airbag module 7, so that the cover 14 completely overlaps the airbag module 7. A plurality of eyelets 15 projecting towards the carrier element 2 are formed on both longitudinal sides of the plastic cover 14, wherein, in the mounted position, the eyelets 15 each laterally overlap a side wall 16 of the carrier element 2. The cover 14 is attached to the carrier element 2 by way of suitable fastening elements 17, here, for example, in the form of plastic rivets, which are inserted into corresponding openings on the carrier element 2 or physically pressed into the carrier element, wherein for this purpose, for example, the plastic rivets are welded to the plastic material of the carrier element 2.

Overall, the heel airbag 1 has a very flat construction when the parts are assembled, wherein the three-dimensional rear side geometry, which is to say, the form-fit geometry 4, of the carrier element 2 ensures the secure and accurately positioned mounting on the body. The carrier element 2, preferably a foam element as described, is on the one hand sufficiently stable so that the carrier element 2 can also be stressed when the airbag 8 is deployed and does not change its shape. In addition, the carrier element 2 also offers a certain damping function, in particular as a result of the given foam structure.

Figure 2:
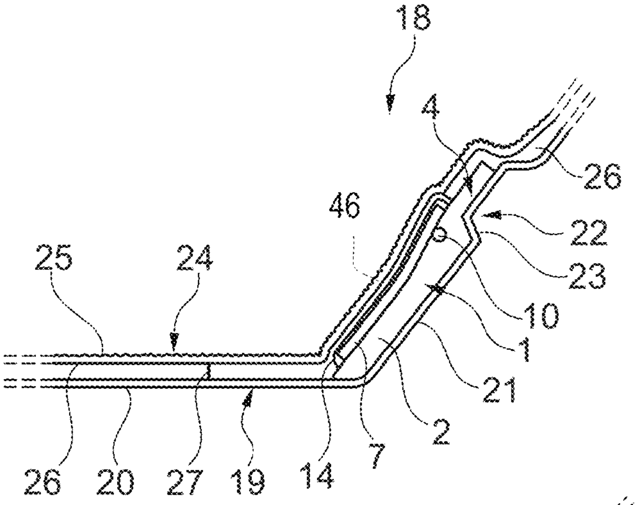
FIG. 2 shows a partial view of a motor vehicle according to the present disclosure with a heel airbag in a non-ignited state according to the present disclosure.

FIG. 2 shows a schematic representation of the assembly situation of the heel airbag 1. A motor vehicle 18 according to the present disclosure comprising a body 19 is shown in detail, wherein the body 19 comprises a horizontal body section 20 and a body section 21 extending obliquely upwards therefrom. The body section extending obliquely upward has a three-dimensional body structure 22, here in the form of a step 23, comparable to the step 4 of the carrier element 2. Of course, a corresponding elongated projection can also be part of the body structure 22, that corresponds to the groove 6 of the carrier element 2 and the like. The body structure 22 is therefore a positive image of the form-fitting structure 4. The carrier element 2 with its form-fitting structure 4 engages positively in the body structure 22, which of course also includes the body area corresponding to the large rear side section of the carrier element 2, wherein the precise positioning of the heel airbag 1 is achieved by way of this form-fitting engagement. The airbag module 7 as well as the cover 14 are also shown.

A carpet 24 is also shown, which overlays the body 19, which is to say, the interior floor. This consists on the one hand of an upper carpet layer 25 and a relatively rigid or stable carrier layer 26 that is firmly connected to it, which gives the carpet 24 stability and shape. The carrier layer 26 only extends to an edge 27, over which a bend line is formed, which will be elucidated below. Up to edge 27, the carpet layer 25 extends in an unsupported manner, which is to say, in particular in the area in which the carpet 24 and thus the carrier layer 25 overlaps the heel airbag 1. At the upper end, the carrier layer 26 is once again present and consequently the carpet 24 is once again stable, the carpet layer 25 is secured.

Figure 3:
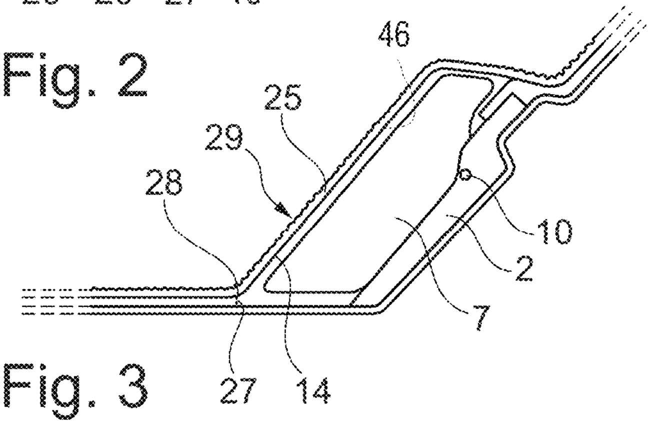
FIG. 3 shows the arrangement from FIG. 2 with the airbag deployed.

FIG. 2 shows the airbag 7 in its folded up state. In the event of a collision, ignition takes place using the gas generator 10, the airbag 7 is inflated and increases its volume. The shape of the airbag 7 is specifically predetermined. The increase in volume causes the carpet layer 25, which rests loosely on the heel airbag 1, to arch, as FIG. 3 shows. This means that when the airbag 7 is filled, the cover 14 is released from its attachment to the carrier element 2 or is respectively torn out and carried along, while on the other hand the loose carpet layer 25 is also moved. This pivots about a bend line 28, which is formed by way of the edge 27, and similarly about an upper bend line, which is formed in the area of the transition of the carpet layer 25 to the carrier layer 26, but this is not shown more precisely. Along this bend line 28, which extends transversely through the footwell in the transverse direction of the vehicle, a defined position is defined for the heel bearing point at which the heel of a person sitting in an adjacent seat is supported in the event of a collision. Consequently, the loose carpet layer 25 pivots about this bend line 28, so that a corresponding bearing surface 29 is created, also as a result of the geometry of the airbag 7, on which the foot of the person is supported. The heel bearing point, which according to FIG. 2, in the unignited state, is positioned further forward in the longitudinal direction of the vehicle and corresponds to the transition from the horizontal to the inclined carpet section, is therefore clearly shifted towards the inside of the vehicle.

Figure 4:
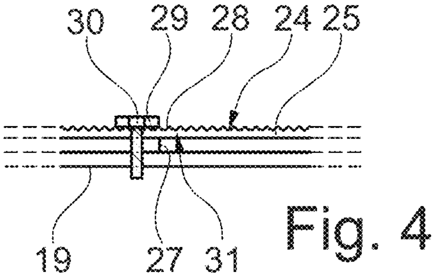
FIG. 4 shows a schematic representation of the formation of a bend line.

FIG. 4 shows an additional option for forming the bend line 28. Here, in addition to the edge 27, a strip 29 is screwed to the body 19 using suitable fastening elements 30. This strip 29 also extends in the transverse direction of the vehicle over the carpet 24. The front edge of the strip once again defines the corresponding bend line, here in conjunction with the edge 27. In such an embodiment, removing the carrier layer 26 may not be necessary in the area of the overlap over the heel airbag 1.

In addition, the option of forming a groove-like material recess 31 on the carpet layer 25 is indicated here, once again to support or respectively form the bend line 28, wherein this material recess 31 is optional or an alternative to the use of a strip 29. The material recess can also be provided on the carrier layer 26 if such a carrier layer is present in the area of the desired bend line.

Figure 5:
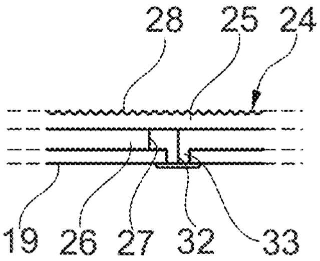
FIG. 5 shows a further schematic representation of the formation of a bend line.

FIG. 5 shows a configuration in which a plurality of locking elements 32 are provided or respectively protrude on the underside of the carpet 24 or respectively of the carpet layer 25, which locking elements snap into the corresponding apertures 33 of the body 19. The locking elements 32 may be hook connections. This, once again, defines the bend line 28, here in addition to the edge 27, after the carpet 24 is secured on the body side by way of this latching or snapping. Alternatively, the locking elements can also be present on the carrier layer, if one is present.

Figure 6:
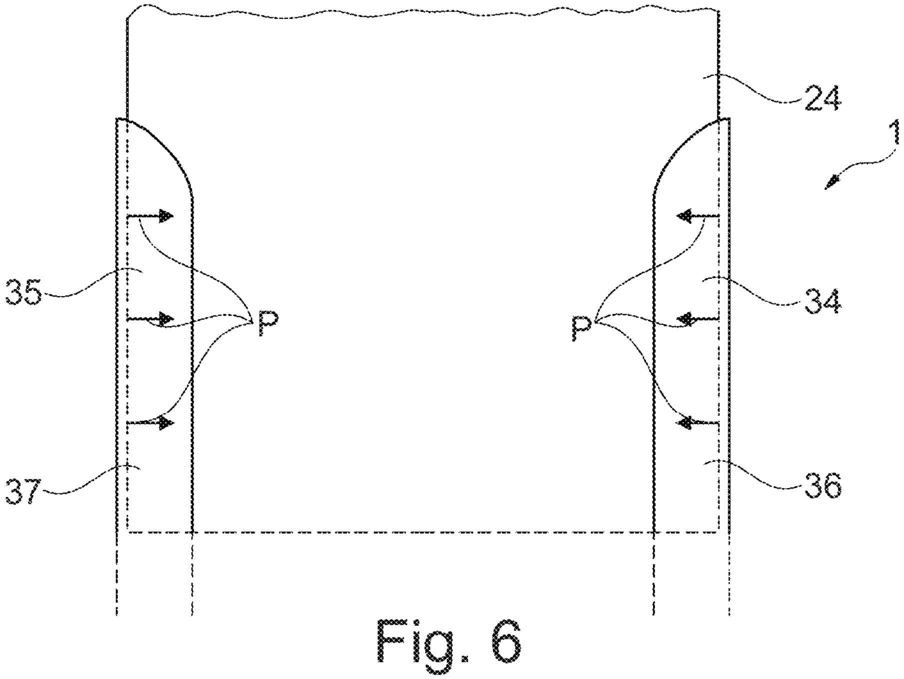
FIG. 6 shows a schematic representation of a first option for the configuration of the side section of the carpet.

FIG. 6 shows a detail of the motor vehicle 1, wherein here the carpet 24 with its side sections 34, 35 are positioned under elongated cladding elements 36, 37, for example, sill or center console panels or the like, which is to say, the cladding elements 36, 37 overlay the side sections 34, 35. Under the cladding elements 36, 37 there is a sufficient amount of carpet material, possibly also folded, which, as the arrows P show, is pulled out from under the cladding element 34, 35 when the airbag 7 is deployed, which is to say, material is fed laterally and consequently the airbag 7 is also formed as a whole in the transverse direction of the vehicle. This means that the airbag 7 can fully deploy, the carpet 24 does not hinder this deployment in the transverse direction, nor in the upward direction. Preferably, only the carpet layer 25 is present in the area of the side sections 34, 35, so that the side sections 34, 35 are sufficiently flexible.

Figure 7:
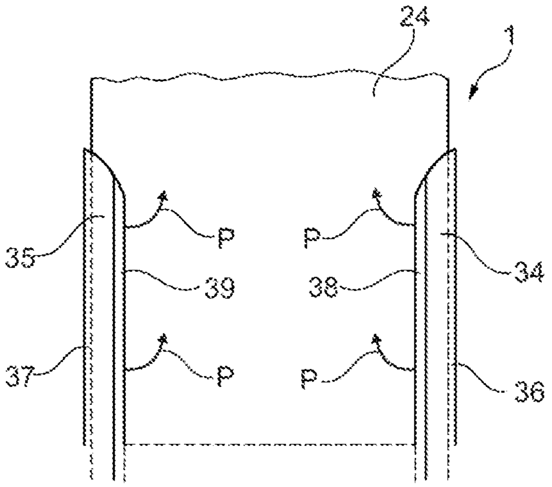
FIG. 7 shows a schematic representation of a second option for the configuration of the side section of the carpet.

FIG. 7 shows a comparable arrangement on the motor vehicle 1 side, in which the carpet 24 is once again overlapped by the cladding elements 36, 37 in the area of the side sections 34, 35. In this configuration, each cladding element 36, 37 comprises a virtually inner section 38, 39, which is either made of a more flexible material than the rest of the cladding element 36, 37, or which is configured to be foldable using a bend line. If the airbag 7 is deployed, the corresponding section 38, 39 is pivoted upwards, as shown by the arrows P in FIG. 7, so that it does not hinder the movement of the corresponding side section 34, 35 and the airbag 7 can also be fully deployed in the transverse direction. Here too, only the carpet layer 25 can be present in the area of the side sections 34, 35, but not the carrier layer 26.

Figure 8:
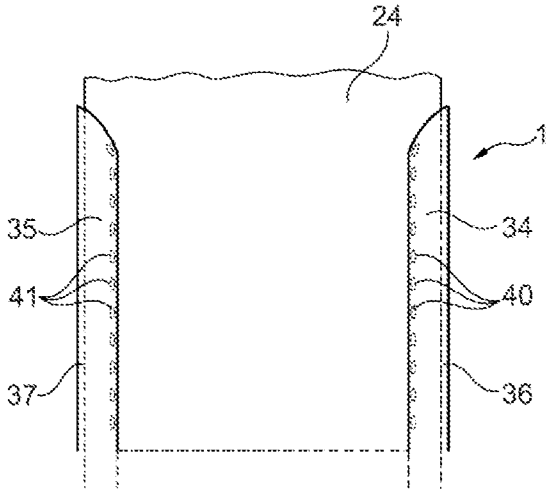
FIG. 8 shows a schematic representation of a third option for the configuration of the side section of the carpet.

Finally, FIG. 8 shows a detail of the motor vehicle 1 in which the carpet 24 is provided with a perforation 40, 41, for example, in the form of longitudinal slots or the like, in the area of its side sections 34, 35. The respective perforation 40, 41 is located below the corresponding cladding element 36, 37 and is therefore not visible. If the airbag 7 is deployed, the carpet 24 tears open along the perforations 40, 41, which is to say, the side section 34, 35 overlapped by the cladding element 36, 37 is torn open or torn off and does not hinder the deployment movement. Here too, only the carpet layer 25 can be present in the area of the side sections 34, 35, however not the carrier layer 26.

Figure 9:
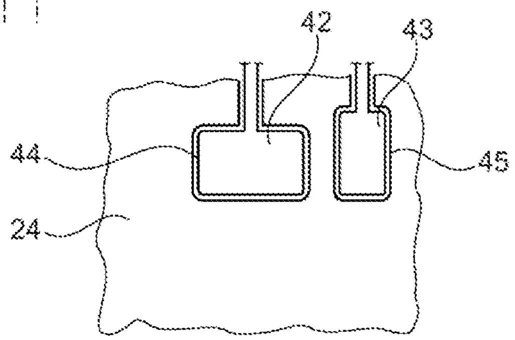
FIG. 9 shows a schematic representation of the embedding of the pedal set in the deployed protective structure.

Lastly, FIG. 9 shows a detail of the vehicle with the airbag deployed. Two pedals 42, 43 are additionally shown, below which the heel airbag 1 is arranged and deployed. Indentations 44, 45 are formed on the carpet 24 and eventually also in the deployment geometry of the airbag 7, into which the pedals 42, 43 are embedded when the airbag 7 or respectively the carpet 24 folds against the pedals 42, 43 coming from below. The pedals 42, 43, which have virtually flat surfaces, are inserted and embedded in such a way that a closed or respectively flat surface is created over the carpet 24 and the pedal surfaces. This means that the pedal set or respectively the pedal geometry is also taken into account with regard to the formation of the bearing surface and as a consequence the carpet 24, and eventually also the airbag 7, have an almost negative shape to the pedal set, resulting in a homogeneous bearing surface.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A heel airbag for a motor vehicle, comprising:
- a carrier element;
- an airbag module arranged on a front side of the carrier element; and
- a cover fastened to the carrier element and covering the airbag module,
- wherein a rear side of the carrier element has a three-dimensional form-fitting structure for connecting to a three-dimensional body structure of the motor vehicle in the mounted position, and
- wherein the cover is provided with a sensor film for detecting damage to the cover.

2. The heel airbag according to claim 1, wherein the carrier element is a foam element.

3. The heel airbag according to claim 1, wherein the cover is a plastic film, a woven fabric or a non-woven fabric.

4. The heel airbag according to claim 1, wherein the airbag module is secured to the carrier element by way of the cover.

5. The heel airbag according to claim 1, wherein the cover is connected to the carrier element by way of a plurality of screw, rivet or snap-in connections or by way of an adhesive or clamp connection.

6. The heel airbag according to claim 5, wherein the cover is connected to the carrier element along at least two side borders with which borders it laterally overlaps the carrier element.

7. The heel airbag according to claim 1, wherein the airbag module comprises a gas generator which, in relation to the mounted position, is positioned in an upper half of the airbag module.

8. The heel airbag according to claim 7, wherein the gas generator is positioned in an upper third of the airbag module in relation to the mounted position.

9. A motor vehicle, comprising:
- a body, and
- at least one heel airbag comprising:
  - a carrier element;
  - an airbag module arranged on a front side of the carrier element; and
  - a cover fastened to the carrier element and covering the airbag module,
  - wherein a rear side of the carrier element has a three-dimensional form-fitting structure for connecting to a three-dimensional body structure of the motor vehicle in the mounted position, and
  - wherein the at least one heel airbag is form-fittingly connected to a body structure by way of the form-fitting structure,
- wherein the at least one heel airbag is overlapped by a carpet which is not connected to the at least one heel airbag or which is connected to the at least one heel airbag, and wherein at least one indentation is formed on the carpet, into which at least one pedal is embedded when the airbag is deployed.

10. The motor vehicle according to claim 9, wherein a bend line is formed on the carpet extending adjacent to a lower end of the at least one heel airbag.

11. The motor vehicle according to claim 10, wherein a bend line is formed on the carpet extending adjacent to an upper end of the at least one heel airbag.

12. The motor vehicle according to claim 10, wherein the carpet comprises a carpet layer and a carrier layer applied underneath the carpet layer, wherein the carrier layer is not provided in the area in which the carpet overlaps the airbag module.

13. The motor vehicle according to claim 12, wherein the carrier layer is a foam layer.

14. The motor vehicle according to claim 10, wherein:

a strip that defines the bend line is arranged on the carpet, which strip is connected to a substructure; or the carpet is secured to the underside by way of hook connections; or a material recess that defines the bend line is provided on the substructure of the carrier layer or of the carpet layer.

15. The motor vehicle according to claim 9, wherein the airbag has a shape adapted to an adjacent pedal set in the deployed state.

16. A motor vehicle, comprising:

a body, and at least one heel airbag comprising:

a carrier element;

an airbag module arranged on a front side of the carrier element; and a cover fastened to the carrier element and covering the airbag module, wherein a rear side of the carrier element has a three-dimensional form-fitting structure for connecting to a three-dimensional body structure of the motor vehicle in the mounted position, and wherein the at least one heel airbag is form-fittingly connected to a body structure by way of the form-fitting structure, wherein the at least one heel airbag is overlapped by a carpet which is not connected to the at least one heel airbag or which is connected to the at least one heel airbag, and wherein the carpet is covered on one or both longitudinal sides with a cladding element, and wherein the carpet with a side section extends below the cladding element such that upon deployment of the airbag, the carpet can be pulled out with the side section that is underneath the cladding element.

17. A motor vehicle, comprising:

a body, and at least one heel airbag comprising:

a carrier element;

an airbag module arranged on a front side of the carrier element; and a cover fastened to the carrier element and covering the airbag module, wherein a rear side of the carrier element has a three-dimensional form-fitting structure for connecting to a three-dimensional body structure of the motor vehicle in the mounted position, and wherein the at least one heel airbag is form-fittingly connected to a body structure by way of the form-fitting structure, wherein the at least one heel airbag is overlapped by a carpet which is not connected to the at least one heel airbag or which is connected to the at least one heel airbag, and wherein the carpet is covered on one or on both longitudinal sides with a cladding element, wherein the carpet with a side section extends below the cladding element, wherein:

the carpet is perforated to form a tear line in the area of the cladding element; or the cladding element has a flexible section in the area of the end which is adjacent to the carpet or a section which can be bent out using a bend line.

* * * * *